(12) United States Patent
Shelley et al.

(10) Patent No.: US 6,230,104 B1
(45) Date of Patent: May 8, 2001

(54) COMBINED PICKOFF AND OSCILLATORY DRIVER FOR USE IN CORIOLIS FLOWMETERS AND METHOD OF OPERATING THE SAME

(75) Inventors: Stuart J. Shelley, Cincinnati, OH (US); Timothy J. Cunningham, Boulder, CO (US)

(73) Assignee: Micro Motion, Inc., Boulder, CO (US)

( * ) Notice: Subject to any disclaimer, the term of this patent is extended or adjusted under 35 U.S.C. 154(b) by 0 days.

(21) Appl. No.: 08/940,580

(22) Filed: Sep. 30, 1997

(51) Int. Cl.[7] ........................................... G01F 1/60
(52) U.S. Cl. ........................ 702/56; 702/45; 702/64; 73/861.354; 73/861.356; 73/861.357
(58) Field of Search ................... 702/33, 38, 41, 702/45, 48, 50, 54, 56, 57, 64, 65, 100, 103, 105–107, 115, 117, 118, 124, 126, 182–184, 190, 192, FOR 123, FOR 124, FOR 126–FOR 128, FOR 105, FOR 106, FOR 104, FOR 164, FOR 170; 700/280, 282; 703/7, 9, 13, 14, 3; 708/815, 819; 73/861.354–357, 861.18, 861.02, 861.03, 32 A, DIG. 1, 570, 592, 602, 650, 662–664, 667, 668; 324/207.11, 207.15–17, 257, 258, 600, 605, 909, 654, 727, 656

(56) References Cited

U.S. PATENT DOCUMENTS

| Re. 31,450 | 11/1983 | Smith | 73/861.356 |
|---|---|---|---|
| 4,109,524 | 8/1978 | Smith | 73/861.357 |
| 4,491,025 | 1/1985 | Smith | 73/861.355 |
| 4,729,243 | 3/1988 | Friedlande et al. | 73/861.355 |
| 4,777,833 | 10/1988 | Carpenter | 73/861.38 |
| 5,009,109 | 4/1991 | Kalotay et al. | 73/861.38 |
| 5,349,872 | * 9/1994 | Kalotay et al. | 73/861.355 |
| 5,781,020 | * 7/1998 | Imai et al. | 702/65 |
| 5,854,430 | * 12/1998 | Drahm et al. | 73/861.354 |

\* cited by examiner

Primary Examiner—Hal Wachsman
(74) Attorney, Agent, or Firm—Chrisman, Bynum & Johnson, P.C.

(57) ABSTRACT

An oscillatory vibration driver is operably connected to a Coriolis flowmeter for use in vibrating the meter flow tubes. The meter electronics contain a mimetic circuit that permits use of the driver as a signal pickoff which provides a measurement of back electromotive force for use in calculating mass flow rate and density from the Coriolis flowmeter. The mimetic circuit contains an analog coil and magnet that facilitate the measurement of back electromotive force, or the mimetic circuit may comprise digital means.

17 Claims, 7 Drawing Sheets

COMBINED PICKOFF AND OSCILLATORY DRIVER FOR USE IN CORIOLIS FLOWMETERS AND METHOD OF OPERATING THE SAME

FIELD OF THE INVENTION

The present invention pertains to the field of oscillatory vibrational drivers that are used to convert electrical power into mechanical actuation and, particularly, oscillatory drivers of the type that vibrate the flow tubes of a Coriolis flowmeter in obtaining Coriolis-based flow measurements. Still more specifically, the oscillatory driver according to the present invention incorporates circuitry that permits the oscillatory driver to be used as a signal pickoff device which measures vibrational modes of the Coriolis flow tubes.

STATEMENT OF THE PROBLEM

It is known to use Coriolis effect mass flowmeters to measure mass flow and other information for materials flowing through a conduit. Exemplary Coriolis flowmeters are disclosed in U.S. Pat. No. 4,109,524 of Aug. 29, 1978, U.S. Pat. No. 4,491,025 of Jan. 1, 1985, and Re. 31,450 of Feb. 11, 1982, all to J. E. Smith et al. These flowmeters have one or more flow tubes of straight or curved configuration. Each flow tube configuration in a Coriolis mass flowmeter has a set of natural vibration modes, which may be of a simple bending, torsional or coupled type. Each flow tube is driven to oscillate at resonance in one of these natural modes. Material flows into the flowmeter from a connected conduit on the inlet side of the flowmeter, is directed through the flow tube or tubes, and exits the flowmeter through the outlet side. The natural vibration modes of the vibrating, material filled system are defined in part by the combined mass of the flow tubes and the material flowing within the flow tubes.

When there is no flow through the flowmeter, all points along the flow tube oscillate due to an applied driver force with identical phase or small initial fixed phase offset which can be corrected. As material begins to flow, Coriolis forces cause each point along the flow tube to have a different phase. The phase on the inlet side of the flow tube lags the driver, while the phase on the outlet side leads the driver. Pick-off sensors are placed on the flow tube to produce sinusoidal signals representative of the motion of the flow tube. Signals output from the pick-off sensors are processed to determine the phase difference between the pick-off sensors. The phase difference between two pick-off sensor signals is proportional to the mass flow rate of material through the flow tube.

An essential component of every Coriolis flowmeter, and of every vibrating tube densitometer, is the drive or excitation system. The drive system operates to apply a periodic physical force to the flow tube which causes the flow tube to oscillate. The drive system includes a driver mounted to the flow tube(s) of the flowmeter. The driver mechanism typically contains one of many well known arrangements, such as a magnet mounted to one conduit and a wire coil mounted to the other conduit in an opposing relationship to the magnet. A drive circuit continuously applies a periodic, typically sinusoidally or square shaped, drive voltage to the driver. Through interaction of the continuous alternating magnetic field produced by the coil in response to the periodic drive signal and the constant magnetic field produced by the magnet, both flow conduits are initially forced to vibrate in an opposing sinusoidal pattern which is thereafter maintained. Those skilled in the art recognize that any device capable of converting an electrical signal to mechanical force is suitable for application as a driver. See U.S. Pat. No. 4,777,833 issued to Carpenter and assigned on its face to Micro Motion, Inc. Also, one need not use a sinusoidal signal but rather any periodic signal may be appropriate as the driver signal. See U.S. Pat. No. 5,009,109 issued to Kalotay et. al. and assigned on its face to Micro Motion, Inc.

A typical mode, although not the only mode, in which Coriolis flowmeters are driven to vibrate is the first out-of-phase bending mode. The first out-of-phase bending mode is the fundamental bending mode at which the two tubes of a dual tube Coriolis flowmeter vibrate in opposition to one another. However, this is not the only mode of vibration present in the vibrating structure of a Coriolis flowmeter that is driven in the first out-of-phase bending mode. Ultimately, there are hundreds of vibration modes actually excited in a Coriolis flowmeter that is driven to oscillate in the first out-of-phase bending mode. Thus a Coriolis flowmeter driven to oscillate or resonate at the first out-of-phase bending mode actually has a conduit(s) oscillating in many other modes in addition to the first out-of-phase bending mode. Meters driven to oscillate in a different mode than the first out-of-phase bending mode experience the same phenomenon of multiple excited modes in addition to the intended drive mode.

Existing drive systems process a feedback signal, which is typically one of the pick-off sensor signals, in order to produce the drive signal. Unfortunately, the drive feedback signal contains responses from other modes in addition to the desired mode of excitation. Thus, the drive feedback signal is filtered through a frequency domain filter to remove unwanted components and the filtered signal is then amplified and applied to the driver. The frequency domain filter that is used to filter the drive feedback signal is not effective at isolating the single desired drive mode from other mode responses present in the drive feedback signal. There can be off-resonance responses from other modes which are near the desired mode resonance frequency. There might also be resonant responses at frequencies approaching the desired resonance frequency. The filtered drive feedback signal, i.e., the drive signal, typically contains modal content at frequencies other than just the desired mode for excitation of the flow tube.

Problems that derive from the drive signal having modal content at multiple frequencies affect the density measurement made by a Coriolis mass flowmeter. The density measurement in a Coriolis flowmeter or vibrating tube densitometer relies on the measurement of the resonant frequency of the vibrating flow tube. A problem arises when the flow tube is driven in response to a drive signal containing modal content at multiple modes. Superposition of the multiple modes in the drive signal can result in a flow tube that is driven off-resonance from the true resonant frequency of the desired drive mode. An error in the density measurement can result.

Modal filtering techniques can be used to isolate and identify the vibrational modes that are of interest to Coriolis mass flow rate and density calculations. Modal filtering requires additional signal pickoffs to be attached to the vibrating tubes of a Coriolis flow meter, e.g., as in copending U.S. patent application Ser. No. 08/890,785 filed Jul. 11, 1997, to applicant Timothy J. Cunningham, which is hereby incorporated by reference to the same extent as though fully disclosed herein. The use of an additional signal pickoff is associated with additional cost.

Yet another problem arises whenever a driver or pickoff device is connected to the vibrating tube of a Coriolis flowmeter or densitometer. The connection of additional apparatus changes the mass of the total vibrating system and, consequently, alters the natural system harmonics to vibration at different frequencies. The precision of measurement that is obtainable from the meter system having increased mass declines because the increased mass causes the meter to become less sensitive to small vibration variances. Calibration to correct for these differences is complicated by the fact that variations in system mass also affect the placement of the driver and pickoffs for maximum performance, meter power consumption, bend modes, and other problems that are discussed above.

There is a need for a drive circuit system for a Coriolis flowmeter that doubles as a signal pickoff to reduce the amount of mass that is connected to the Coriolis flowtubes.

STATEMENT OF THE SOLUTION

The above identified problems, and others, are solved and a technical advance achieved in the field by the drive circuit system of the present invention. The present invention provides a method and apparatus for using a combined driver and signal pickoff device to generate a Coriolis flowmeter or densitometer drive signal while also receiving signals representative of vibrational velocity in the Coriolis meter flowtubes.

A combined oscillatory signal pickoff device and vibrational driver apparatus according to the present invention includes a driver coil assembly having a coil and a magnet. The coil is capable of emanating field effects derived from oscillating voltage applied to the coil. A magnet is centrally disposed within the coil for mechanical oscillation due to the field effects emanating from the coil in the manner of a conventional solenoid. A mimetic circuit provides a second impedance that is comparable to the first impedance when the magnet of the driver coil assembly is held stationary in fixed positional relationship with respect to the coil. A drive voltage is applied to both the driver coil assembly and the mimetic circuit.

The applied drive voltage produces a corresponding voltage in the coil of the driver coil assembly and a corresponding voltage in the mimetic circuit. The relative velocity (i.e., the translational velocity of vibration) between the coil and magnet in the driver coil assembly is determined as a mathematical function of the difference between the coil voltage and the mimetic circuit voltage. This calculation is made possible because the relative velocity between the coil and magnet in the driver coil assembly causes a back electromotive force ("back EMF") in the coil.

A 'mimetic circuit' is hereby defined to mean a circuit that models the performance of the driver coil assembly when the driver coil assembly is held in a fixed or stationary position, i.e., when the coil and magnet of the driver coil assembly are not moving relative to one another. The specific embodiments disclosed below describe analog implementations and a digital implementation of the mimetic circuit.

In the simplest analog case, the mimetic circuit contains a coil and magnet that, in combination, have an overall impedance that is identical to that of the impedance in the driver coil assembly. More specifically, the assembled coil and magnet of the mimetic circuit have a resistance and inductance that are identical to the resistance and inductance of the driver coil assembly. While this first analog embodiment works to accomplish the objects of the invention, power consumption is excessive due to the drain through the mimetic coil.

A more preferred analog embodiment includes a mimetic magnet and coil assembly having an overall impedance that differs by a scale factor from the impedance of the driver coil assembly. More specifically, the inductance of the mimetic coil and magnet assembly may be multiplied by a number to arrive at the inductance of the driver coil assembly. Similarly, the resistance of the mimetic coil and magnet assembly may be multiplied by a number to arrive at the resistance of the driver coil assembly.

In the digital embodiment, an analog to digital converter is used to apply the driver coil voltage to a digital filter. The digital filter models the impedance of the mimetic circuit as a resistance and inductance match to the resistance and inductance of the driver coil assembly. In the digital embodiments, power consumption is greatly reduced to the point of being a negligible power drain in the overall Coriolis flowmeter system.

In operation, an alternating drive voltage causes a corresponding vibration in the driver coil assembly which, in turn, vibrates the flow tubes of a Coriolis flowmeter according to well established Coriolis flow measurement practices. The relative velocity between the driver coil and driver magnet is roughly proportional to the back EMF that derives from vibrations in the Coriolis flow tubes. This back EMF opposes the applied drive voltage. The drive voltage that a voltmeter would measure at the drive circuit consists of the voltage drop across the resistance and inductance of the drive coil plus the back EMF. Drive signal pickoffs are used to measure back EMF for conventional Coriolis flow calculations because back EMF is related to the motion of the vibrating Coriolis flow tubes. According to the present invention, the component of the drive voltage due to the back EMF can be isolated from the component of the drive voltage resulting from the resistance and inductance of the driver. Thus, it is possible to use a driver as a signal pickoff. The combined driver and signal pickoff device is especially useful in modal filtering applications and any other Coriolis mass flow rate or density meter applications because less mass must be attached to the Coriolis flow tube. The subject matter of this invention involves method and apparatus for separating the back EMF measurement from the applied drive voltage signal.

DETAILED DESCRIPTION OF THE PREFERRED EMBODIMENT

Figure 1:
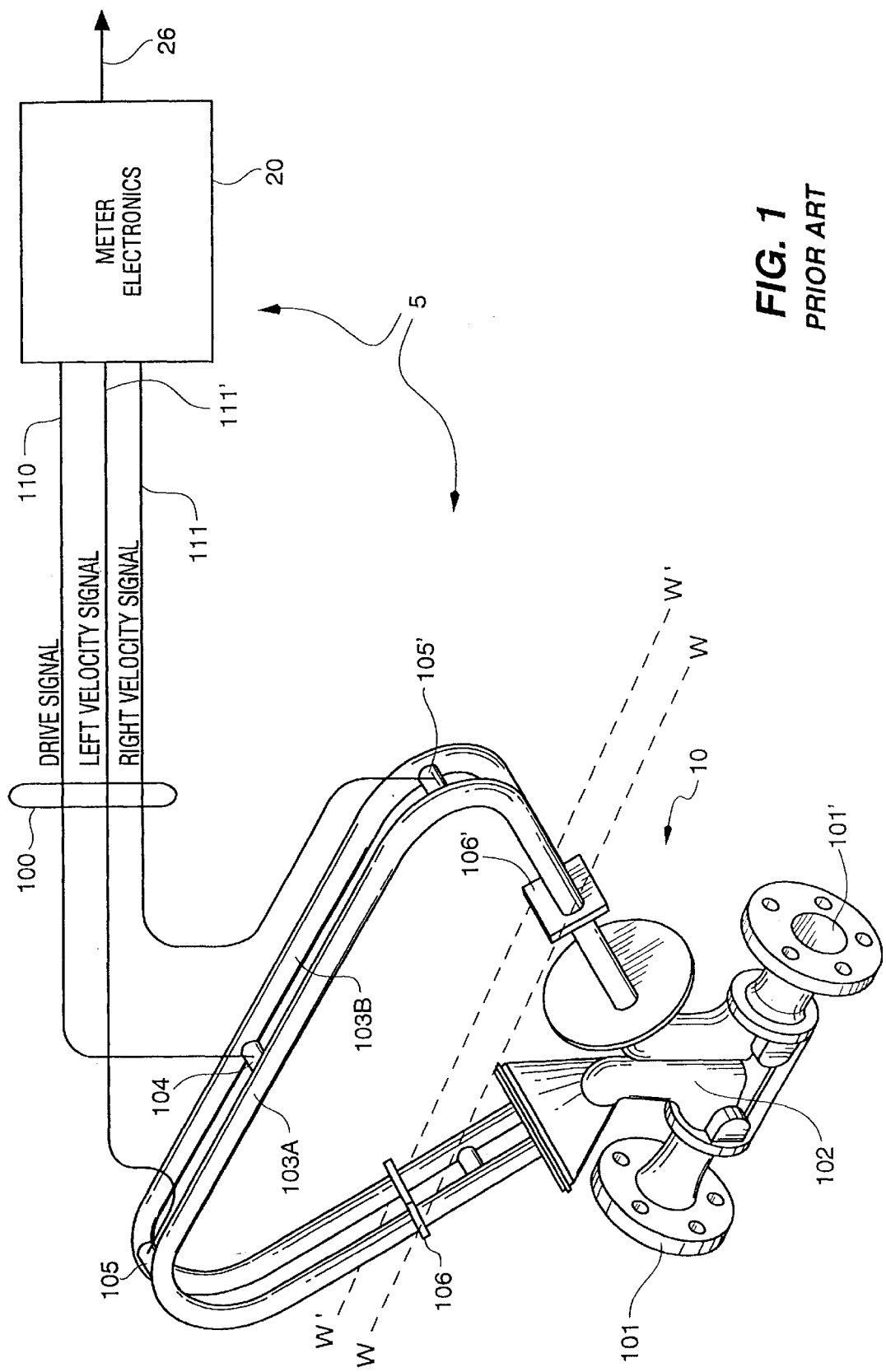
FIG. 1 depicts a prior art Coriolis flowmeter and associated meter electronics.

Coriolis Flowmeter in General—FIG. 1

FIG. 1 shows a Coriolis flowmeter 5 comprising a Coriolis meter assembly 10 and meter electronics 20. Meter electronics 20 is connected to meter assembly 10 via lead 100 to provide density, mass flow rate, volumetric flow rate and totalized mass flow information over path 26. A Coriolis flowmeter structure is described, although, it is apparent to those skilled in the art that the present invention could be practiced in conjunction with a vibrating tube densitometer without the additional measurement capability provided by a Coriolis mass flowmeter.

Meter assembly 10 includes a pair of flanges 101 and 101', manifold 102 and flow tubes 103A and 103B. Connected to flow tubes 103A and 103B are driver 104 and pick-off sensors 105 and 105'. Brace bars 106 and 106' serve to define the axis W and W' about which each flow tube oscillates.

When flowmeter 10 is inserted into a pipeline system (not shown) which carries the process material that is being measured, material enters meter assembly 10 through flange 101, passes through manifold 102 where the material is directed to enter flow tubes 103A and 103B, flows through flow tubes 103A and 103B and back into manifold 102 from where it exits meter assembly 10 through flange 101'.

Flow tubes 103A and 103B are selected and appropriately mounted to the manifold 102 so as to have substantially the same mass distribution, moments of inertia and elastic modulus about bending axes W—W and W'—W', respectively. The flow tubes extend outwardly from the manifold in an essentially parallel fashion.

Flow tubes 103A–103B are driven by driver 104 in opposite directions about their respective bending axes W and W' and at what is termed the first out of phase bending mode of the flowmeter. Driver 104 may comprise any one of many well known arrangements, such as a magnet mounted to flow tube 103A and an opposing coil mounted to flow tube 103B and through which an alternating current is passed for vibrating both flow tubes. A suitable drive signal is applied by meter electronics 20, via lead 110, to driver 104.

Meter electronics 20 receives the left and right velocity signals appearing on leads 111 and 111', respectively. Meter electronics 20 produces the drive signal appearing on lead 110 and causing driver 104 to vibrate tubes 103A and 103B. Meter electronics 20 processes the left and right velocity signals to compute the mass flow rate and the density of the material passing through meter assembly 10. This information is applied by meter electronics 20 over path 26 to a utilization means (not shown).

It is known to those skilled in the art that Coriolis flowmeter 5 is quite similar in structure to a vibrating tube densitometer. Vibrating tube densitometers also utilize a vibrating tube through which fluid flows or, in the case of a sample-type densitometer, within which fluid is held. Vibrating tube densitometers also employ a drive system for exciting the flow tube to vibrate. Vibrating tube densitometers typically utilize only single feedback signal since a density measurement requires only the measurement of frequency and a phase measurement is not necessary. The descriptions of the present invention herein apply equally to vibrating tube densitometers. Those skilled in the art recognize that where an existing Coriolis flowmeter already has two feedback signals available to input to a modal filter, an existing vibrating tube densitometer has only one feedback signal typically available. Thus one need only provide additional feedback signals in a vibrating tube densitometer in order to apply the present invention to a vibrating tube densitometer.

Figure 2:
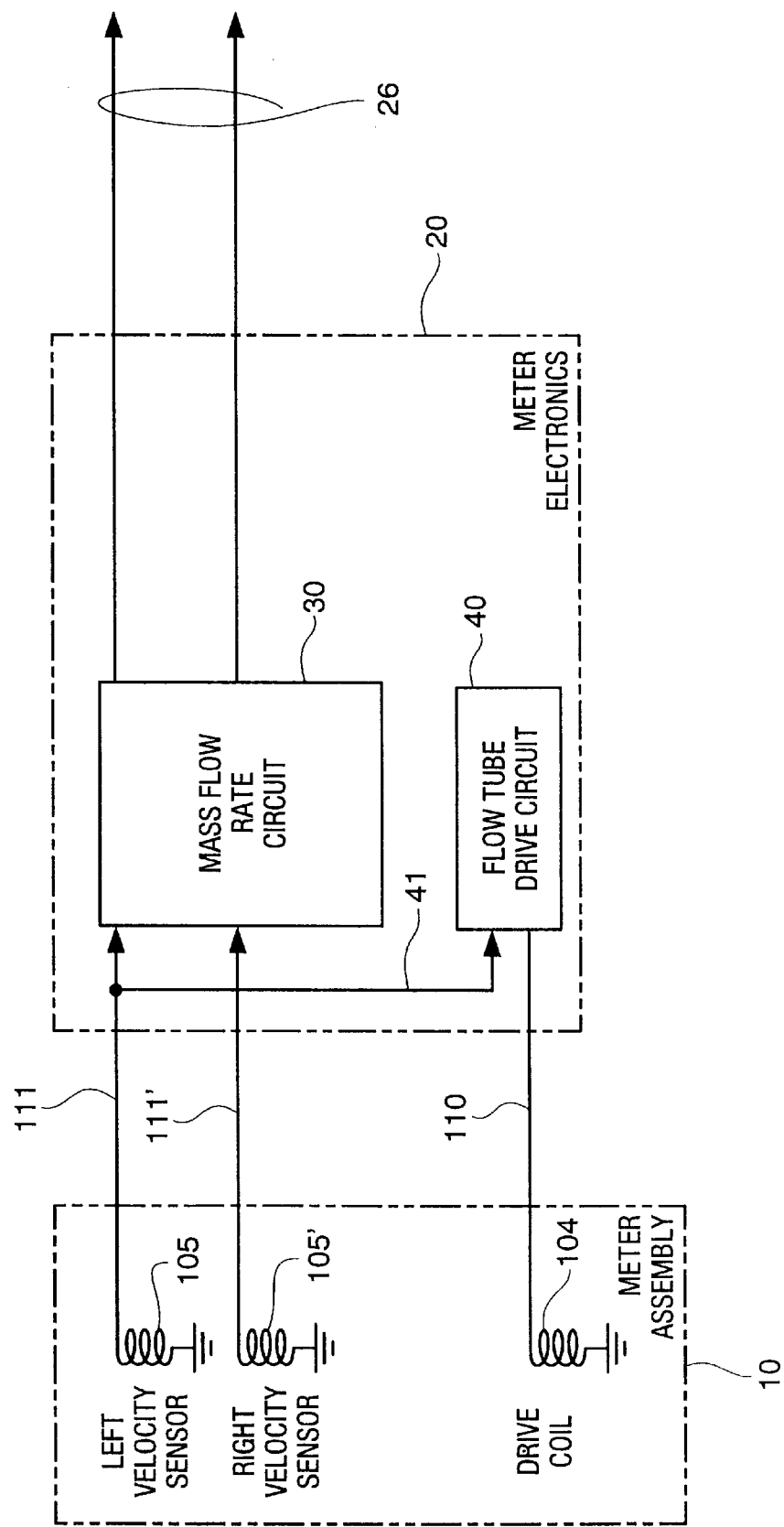
FIG. 2 depicts a block diagram of prior art Coriolis flowmeter electronics.
Figure 3:
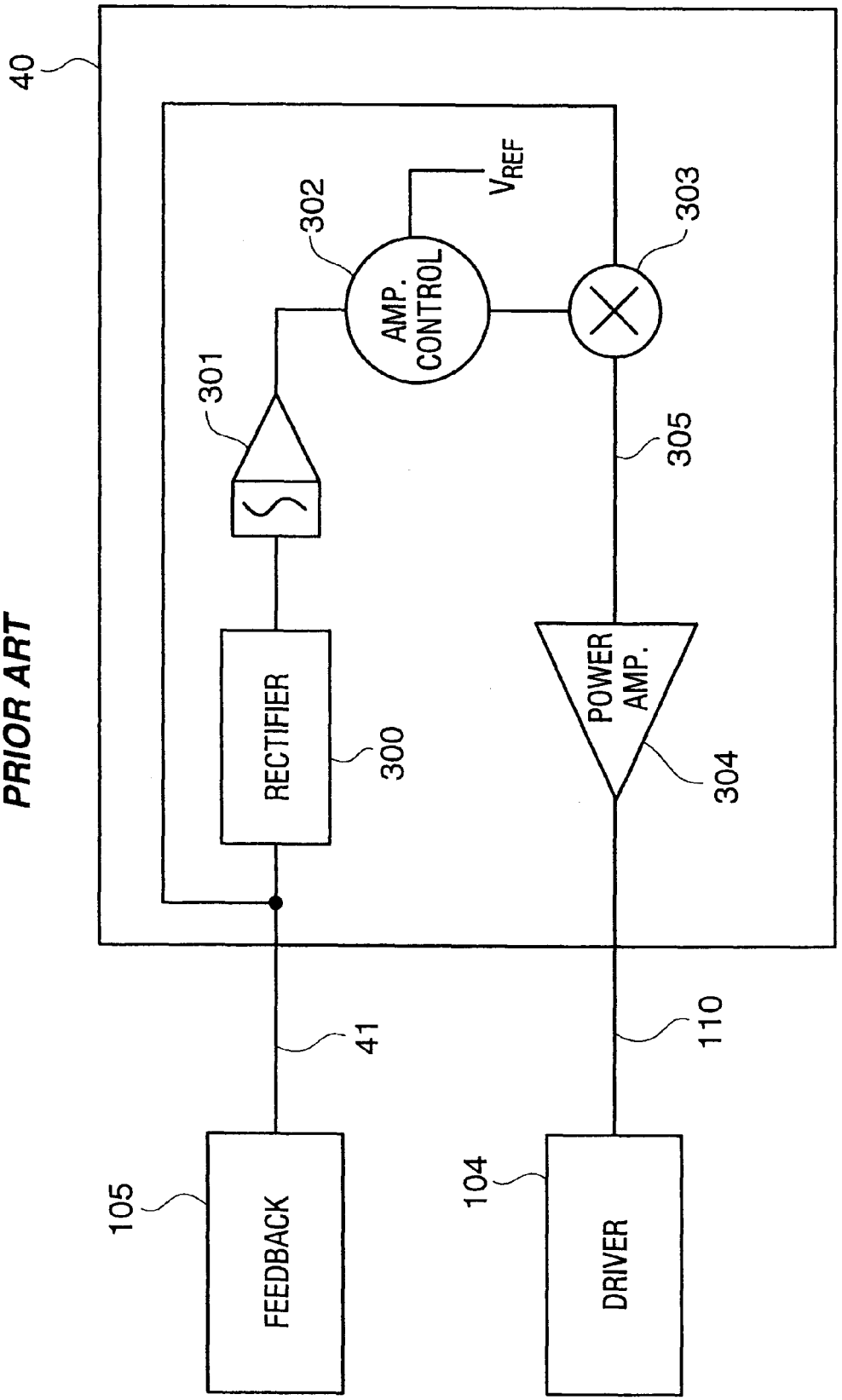
FIG. 3 depicts a block diagram of a prior art drive system for a Coriolis flowmeter.

Prior Art Drive System—FIGS. 2 and 3

FIG. 2 depicts a block diagram of meter electronics 20. Meter electronics 20 includes mass flow rate circuit 30, and drive circuit 40. Mass flow rate circuit 30 is one of many known circuits for calculating the mass flow rate of a fluid through a vibrating tube based on the difference in phase between two points on the vibrating tube. Mass flow circuit 30 produces output to a utilization means (not shown) over line 26. The utilization means might be, for example, a display. The details of mass flow rate circuit 30 are well known to those skilled in the art and do not form part of the present invention. See U.S. Pat. No. RE 31,450 issued to Smith on Nov. 29, 1983, and assigned on its face to Micro Motion, Inc. or U.S. Pat. No. 4,879,911 issued to Zolock on Nov. 14, 1989, and assigned on its face to Micro Motion, Inc. or U.S. Pat. No. 5,231,884 issued to Zolock on Aug. 3, 1993, and assigned on its face to Micro Motion, Inc. for exemplary information regarding mass flow rate circuit 30. In existing drive circuit systems, drive circuit 40 receives a feedback signal over path 41 from left pick-off sensor 105. As described in more detail with respect to FIG. 3, existing drive circuit systems produce a drive signal over path 110 to driver 104. Those skilled in the art recognize that existing drive systems may alternatively utilize the right pick-off sensor as the feedback to drive circuit 40. Also, some existing drive systems utilize the sum of both pick-off signals as the feedback to drive circuit 40.

FIG. 3 illustrates a block diagram of an existing drive circuit 40. Drive circuit 40 receives a feedback signal in the form of one of the pick-off signals from the flowmeter and appropriately conditions the magnitude of the pick-off signal to produce a drive signal over path 110. As noted, some existing drive systems sum the two pick-off signals and process the summed signal to produce a drive signal. Drive circuit 40 receives a signal from pick-off 105 over path 41. The pick-off signal is fed to rectifier 300 and then integrator 301. The signal output from integrator 301 represents an average amplitude of pick-off signal 105. The average amplitude signal is input to amplitude control 302. Amplitude control 302 compares the average amplitude signal from integrator 301 to a reference voltage $V_{ref}$. If the average amplitude falls below the reference voltage then the pick-off signal is amplified at multiplier 303 and an amplitude-conditioned pick-off signal is output from multiplier 303. The amplitude conditioned pick-off signal is amplified by power amplifier 304 to produce the final drive signal that is fed back to driver 104. Thus drive circuit 40 operates to maintain a relatively constant amplitude. The details of existing drive control circuitry 40 are well known to those skilled in the art of Coriolis flowmeter electronics and do not form part of the present invention. See U.S. Pat. No. 5,009,109 for a more detailed discussion of multiple embodiments of drive circuit 40.

A Combined Driver Coil Assembly and Pickoff

The present invention involves changes in meter electronics 20 that permit driver 104 to be used as a combined driver 104 and pickoff 105 or 105' (see FIG. 1). Thus, one or more of pickoffs 105 and 105' can be eliminated, or a third velocity signal can be supplied to meter electronics 20 in the manner of the signals that travel on lines 111 and 111' in FIG. 1.

Figure 4:
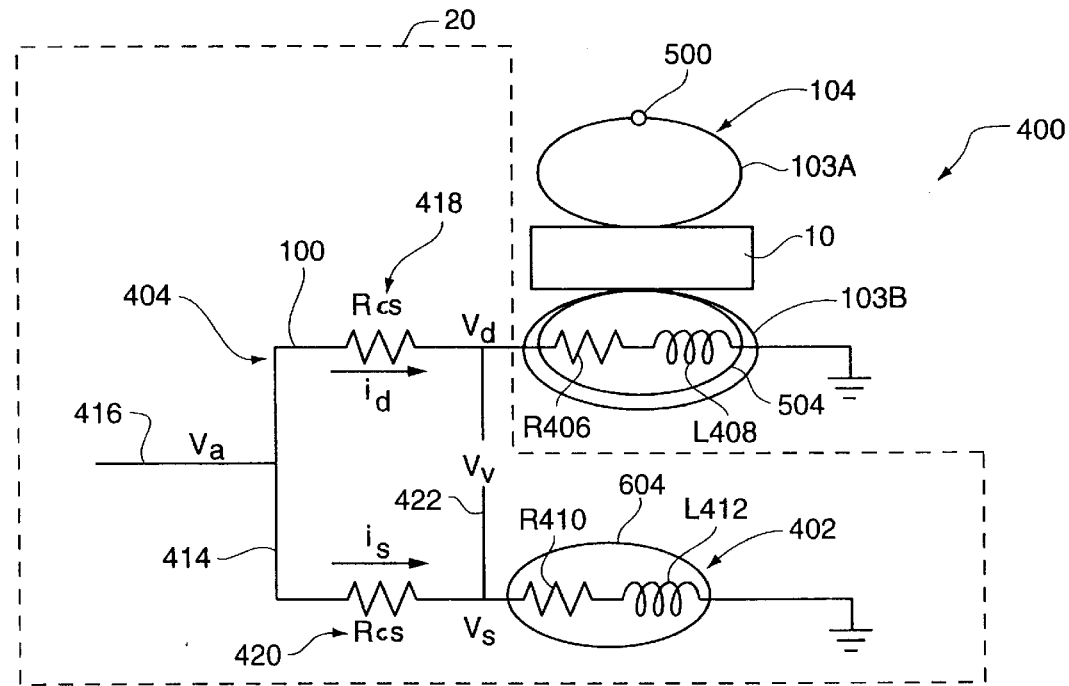
FIG. 4 depicts a schematic circuit diagram of meter electronics for use in practicing the present invention according to a first analog embodiment.

FIG. 4 depicts a circuit schematic 400 comprising a first analog embodiment of an interior component to meter electronics 20 according to the present invention. The major components of circuit schematic 400 include a conventional driver coil assembly indicated as driver 104, a mimetic circuit 402 having an impedance identical to the impedance of driver 104, and connective lines 404.

Figure 5:
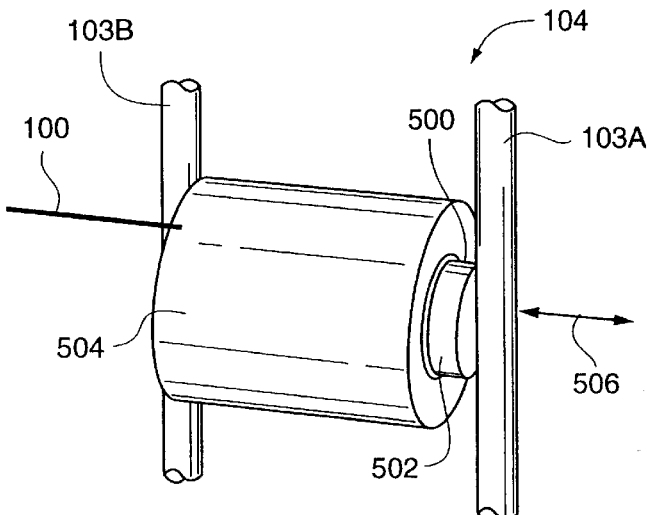
FIG. 5 depicts a driver coil assembly for use according to the present invention.

Driver 104 is positioned on Coriolis flowmeter 10 in the same manner as shown in FIG. 1. Specifically, as depicted in FIG. 5, driver 104 contains a cylindrical magnet 500 that is received within a central opening 502 in coil 504. Magnet 500 is affixed to flow tube 103A for actuation of flow tube 103A. Driver coil 504 is affixed to flow tube 103B for actuation of flow tube 103B. The application of an alternating or pulsed drive voltage on line 100 to driver coil 504 causes magnet 500 to reciprocate in the directions of double-headed arrow 506. Flow tubes 103A and 103B provide spring bias that force magnet 502 towards a neutral position within opening 502. In the FIG. 4, driver coil 504 is represented as a resistance $R_{406}$ and an inductance $L_{408}$.

Figure 6:
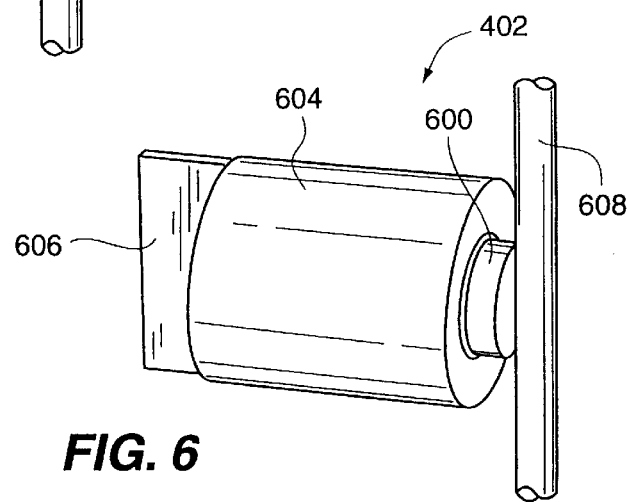
FIG. 6 depicts a mimetic coil assembly for use according to the present invention.

FIG. 6 depicts mimetic circuit 402 in greater detail. Mimetic circuit 402 includes a cylindrical magnet 600, which is disposed in central aperture 602 within coil 604. A stationary plate 606 is coupled with mimetic coil 604. A stationary plate 608 is coupled with magnet 600. Plates 606 and 608 work in opposition to one another to prevent relative motion between coil 604 and magnet 600.

In FIG. 4, mimetic circuit 402 is represented as a resistance $R_{410}$ and an inductance $L_{412}$. According to the embodiment of FIG. 4, $R_{406}$ is identical to $R_{410}$ and $L_{408}$ is identical to $L_{412}$.

Connective lines 404 include drive line 100 (see also FIG. 1), mimetic circuit line 414, and a common supply line 416. Drive line 100 carries voltage $V_a$ from common supply line 416 to a current sensing resistor 418, which is used to measure $i_d$, i.e., the current on drive line 100. The voltage $V_d$ downstream of $R_{cs}$ 418 is calculated as $$V_d = V_a - i_d R_{cs} \quad (1)$$

wherein $V_d$ is the voltage on drive line 100 below $R_{cs}$ 418 and above drive coil 504, $i_d$ is the current on line 100, $R_{cs}$ is the resistivity of current-sensing resistor $R_{cs}$ 418, and $V_a$ is the voltage on common supply line 416.

Similarly, mimetic line 414 carries voltage $V_a$ from common supply line 416 to mimetic coil 604. Drive line 100 carries voltage $V_a$ from common supply line 416 to a current sensing resistor 420, which is used to measure $i_s$, i.e., the current on mimetic line 414. The voltage $V_s$ downstream of $R_{cs}$ 420 is calculated as $$V_s = V_a - i_s R_{cs} \quad (2)$$

wherein $V_s$ is the voltage on drive line 100 below $R_{cs}$ 420 and above drive coil 604, $i_s$ is the current on line 414, $V_a$ is the voltage on common supply line 416, and $R_{cs}$ is the resistivity of current-sensing resistor $R_{cs}$ 420.

A voltage comparator 422 (e.g., a conventional wheatstone bridge or similar circuit) is used to determine $V_v$, which is the difference between the voltage on lines 100 and 414

$$V_v = V_d - V_s \quad (3)$$

The current $i_d$ on line 100 can be expressed mathematically as:

$$i_d = \frac{V_a - EMF}{R + j\omega L} \quad (4)$$

wherein $i_d$ is the current on drive line 100; $V_a$ is the applied voltage to drive line 100 and mimetic line 414; EMF is the back electromotive force on coil 504 due to the movement of magnet 500; R is sum of the resistance $R_{406}$ of drive coil 504 and the resistance, $R_{cs}$, of current sensing resistor 418; j is the square-root of negative one; ω is the frequency of the alternating or pulsed voltage Va applied to drive line 100, and L is the inductance $L_{408}$ on drive coil 504. Equation (4) can be easily arranged to solve for EMF, which is the desired measurement that is needed to solve for a measurement of tube motion according to conventional Coriolis measurement calculations. The conventional Coriolis calculations do not include the ability to separate back EMF from a drive signal, e.g., at driver 104.

Similarly, the current $i_s$ on line 414 can be expressed mathematically as:

$$i_s = \frac{V_a}{R + j\omega L} \quad (5)$$

wherein $i_s$ is the current on mimetic line 414; $V_a$ is the applied voltage to mimetic line 414; R is the sum of the resistance $R_{410}$ of mimetic coil 604 and the resistance, $R_{cs}$, of the current sensing resistor 420; j is the square-root of negative one; ω is the frequency of the alternating or pulsed voltage $V_a$ applied to drive line 100 and is also the relative or angular velocity of magnet 500 with respect to drive coil 504 (see FIG. 6); and L is the inductance $L_{412}$ of the mimetic coil 604 which, by design, is equal to the inductance of the drive coil $L_{408}$.

It follows from the above equations that:

$$V_v = \frac{EMF * R_{cs}}{R + j\omega L} \quad (6)$$

wherein $V_v$ is defined above in equation (3), and the remaining terms are defined with reference to Equation (4). Equation (6) can be solved for EMF, which is the desired variable measured by independent pickoff assemblies 105 and 105' for input to mass flow rate circuit 30 on lines 111 and 111' (see FIG. 2). The conventional mass flow rate circuit 30 of meter electronics 20 (see FIG. 2) is modified for purposes of the present invention to perform the calculation according to equation (6). Thus, EMF calculated according to Equation (6) is used as though the EMF measurement had originated from pickoff 105 or 105'.

Figure 7:
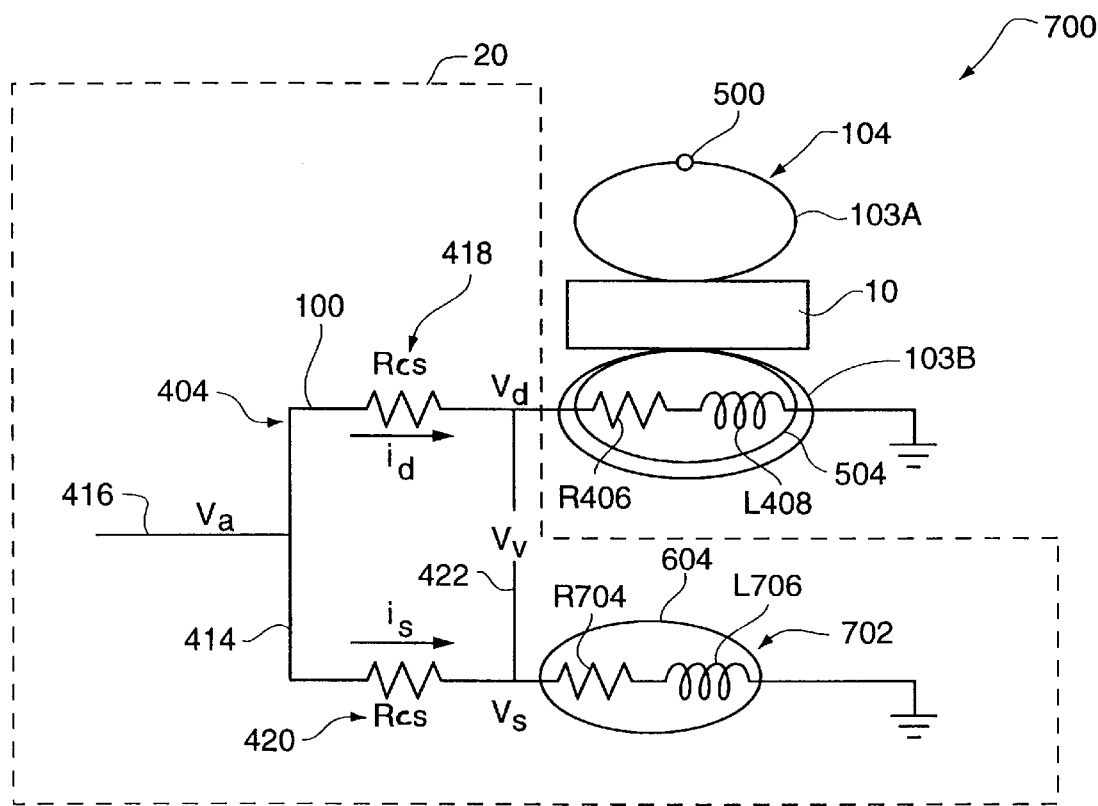
FIG. 7 depicts a schematic circuit diagram of meter electronics for use in practicing the present invention according to a second analog embodiment

FIG. 7 depicts a second analog embodiment of the invention, namely, circuit schematic 700. Like numbering of circuit schematic 400 in FIG. 4 has been retained where is it possible to do so with respect to the substantially identical features of circuit schematic 700 in FIG. 7. Circuit schematic 700 is identical to circuit schematic 400 except that mimetic coil 604 has a resistance $R_{704}$ that differs from $R_{406}$ as:

$$R_{704} = R_{406} * S_R \quad (7)$$

wherein $S_R$ is a scale factor to account for the difference between $R_{704}$ and $R_{406}$. $S_R$ is preferably a value greater than one because $R_{704}$ is preferably greater than $R_{406}$. The flow measurement system saves power when $R_{704}$ is greater than $R_{406}$ because the increased resistance $R_{704}$ reduces the amount of current on mimetic line 414. Similarly, $L_{408}$ differs from $L_{706}$ as:

$$L_{706} = L_{408} * S_R \qquad (8)$$

where $S_R$ is a scale factor to account for the difference between $L_{706}$ and $L_{408}$. In the case of circuit schematic 700, meter electronics 20 make adjustments according to equations (7) and (8) to equate $L_{408}$ with $L_{706}$ and $R_{406}$ with $R_{704}$ before entering calculations according to Equations (1) to (6).

Figure 8:
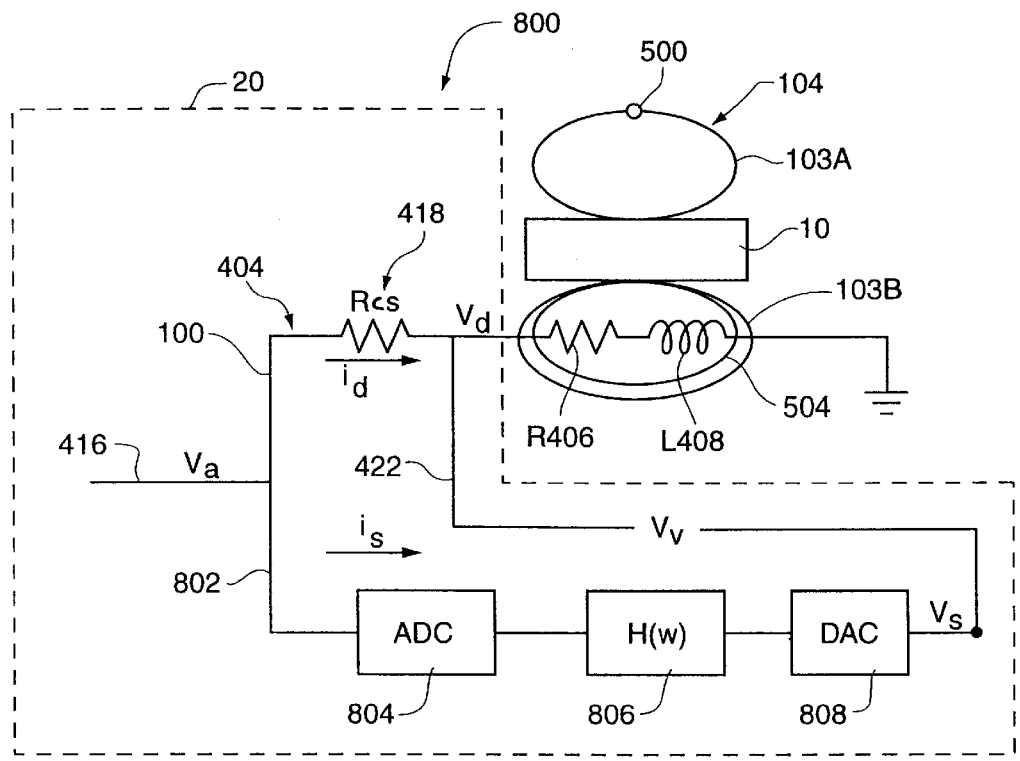
FIG. 8 depicts a schematic circuit diagram of a third embodiment of the present invention including digital electronics.

FIG. 8 depicts a digital circuit schematic 800, which operates to the same effect as circuit schematics 400 and 700, except that circuit schematic 800 saves even more power than does circuit schematic 700. Like numbering of circuit schematic 400 in FIG. 4 has been retained where is it possible to do so with respect to identical features of circuit schematic 800 in FIG. 8. A significant advantage of the digital implementation is that the digital mimetic circuit can easily be tuned or adaptively updated to account for drift in the resistance and inductance of the drive coil.

In the FIG. 8 embodiment, line 802 carries voltage $V_a$ to analog to digital converter 804. A digital filter 806 receives from ADC 804 the digital input corresponding to $V_a$ and uses this digital input to model the same impedance as the mimetic coil 604 on mimetic line 414 of FIG. 4. Digital filters are well known to those skilled in the art, and any conventional or standard variety of digital filter implementation will suffice for use as digital filter 806. A variety of digital filter texts are available to describe conventional digital filter implementations, e.g., as in the book Antonieu, *Digital Filters: Analysis and Design*, McGraw-Hill (1979), which is hereby incorporated by reference to the same extent as though fully disclosed herein. The digital filter 806 uses the frequency of the input voltage $V_a$ to calculate the complex impedance corresponding to mimetic coil 604 of FIG. 4, and outputs the digital voltage $V_s$ with the correct amplitude and phase using conventional digital filter techniques. Digital to analog converter 808 receives the $V_s$ digital signal input from digital filter 806, and converts the signal into an analog signal consisting of the voltage $V_s$. Voltage comparator 422 remains an analog voltage comparator, as in the FIG. 4 embodiment. Thus, circuit schematic 800 comprises a mixture of digital and analog elements.

Figure 9:
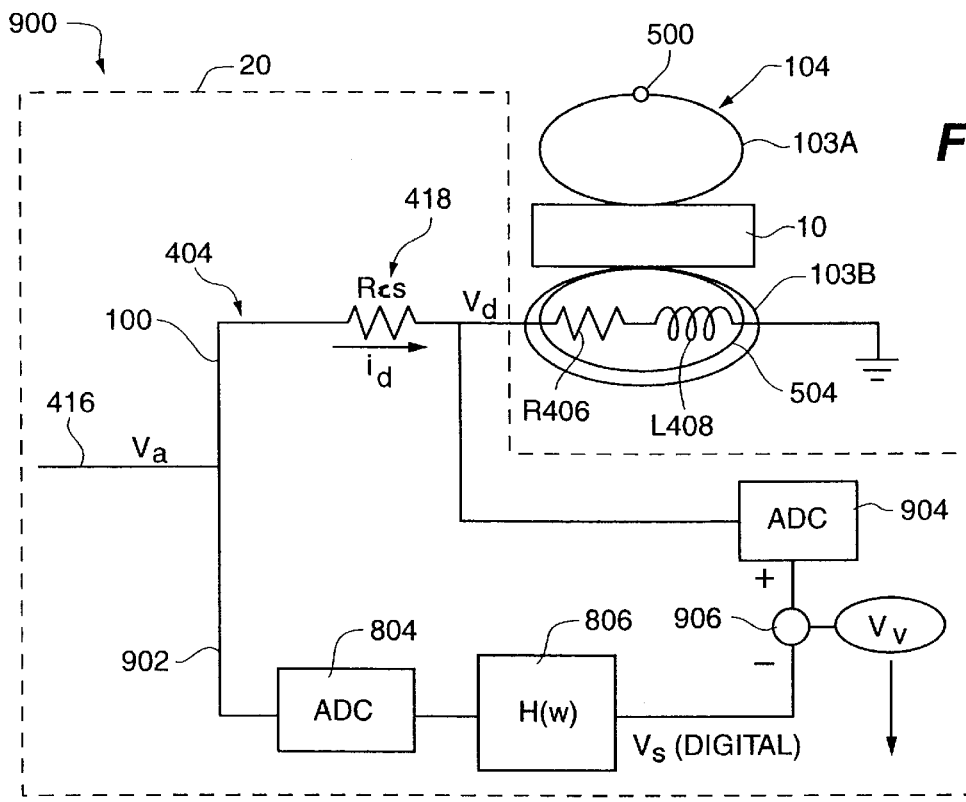
FIG. 9 depicts a schematic circuit diagram of a fourth embodiment of the present invention including all digital electronics.

FIG. 9 depicts a fourth embodiment according to the present invention, which is the most preferred embodiment, namely, circuit schematic 900 comprising an all digital embodiment that conserves more power than any of the embodiments according to FIGS. 4, 7, or 8. The all digital circuit schematic 900 operates to the same effect as circuit schematics 400, 700, 800, except that circuit schematic 800 saves even more power than these other circuit schematics. Like numbering of circuit schematic 800 in FIG. 8 has been retained where is it possible to do so with respect to identical features of circuit schematic 900 in FIG. 9.

In the FIG. 9 embodiment, line 902 carries voltage $V_a$ to analog to digital converter 804, which provides digital output corresponding to $V_a$. A digital filter 806 is used to model the same impedance as the mimetic coil 604 on mimetic line 414 of FIG. 4. The digital filter 806 uses the frequency of the input voltage $V_a$ to calculate the complex impedance corresponding to mimetic coil 604 of FIG. 4, and outputs a digital voltage $V_s$ having the correct amplitude and phase. A second analog to digital converter 904 receives the analog voltage signal $V_d$ from drive line 100 downstream from $R_{cs}$ 418, and converts this analog signal into a digital output. A digital voltage comparator 906 is used to calculate $V_v$, and provides $V_v$ as a digital signal to meter electronics 20 on line 906.

Figure 10:
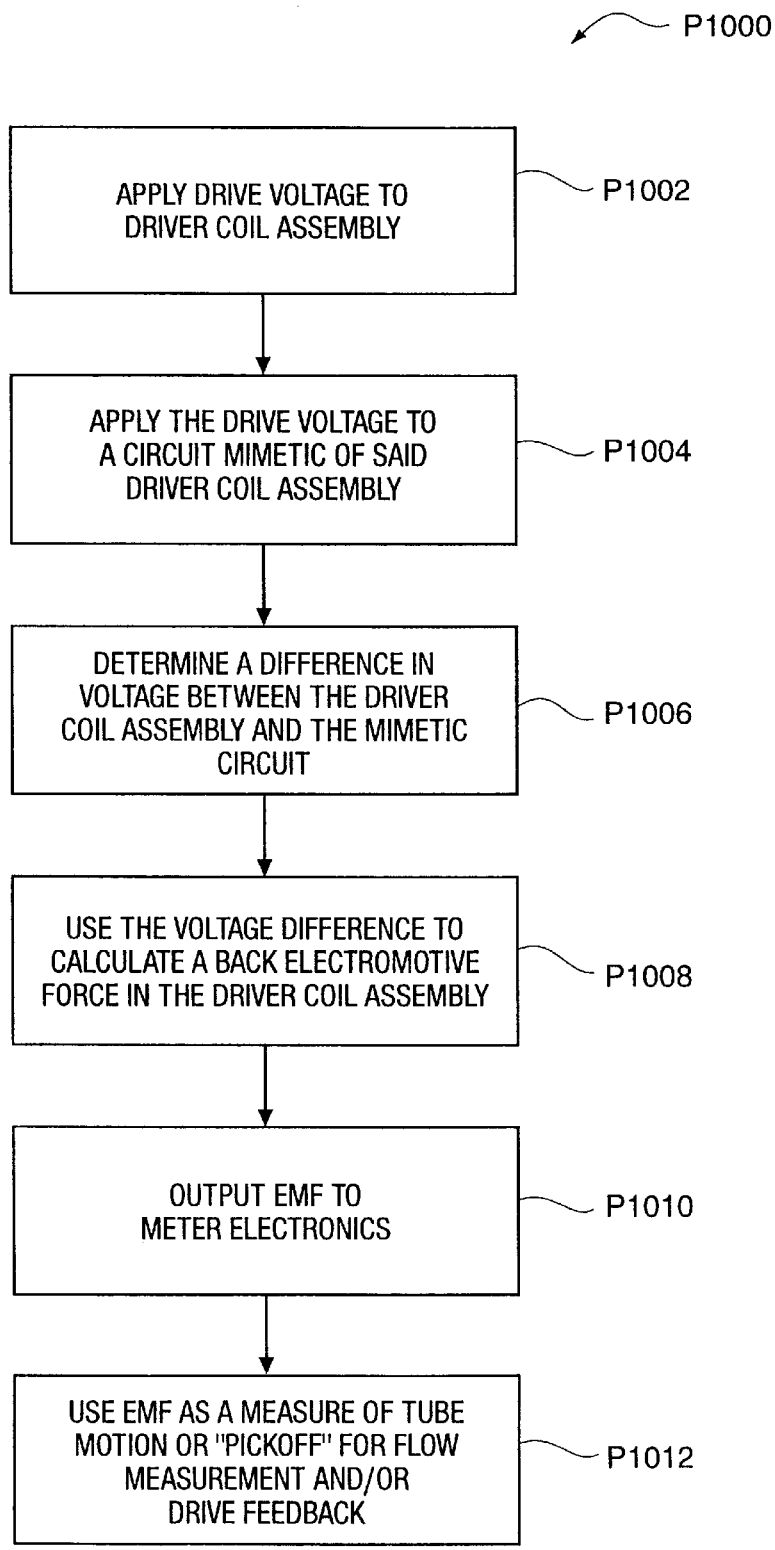
FIG. 10 depicts a process flow diagram for using a driver coil assembly as a pickoff device.

FIG. 10 depicts a schematic process diagram P1000 for using driver 104 as a combined driver and signal pickoff device. FIG. 10 will be described in the context of reference numbers corresponding to FIG. 4, but the functional discussion of FIG. 10 is equally applicable to any of the embodiments shown in FIGS. 4, 7, 8, and 9.

In step P1002, meter electronics 20 apply an alternating or pulsed drive voltage $V_a$ to line 416, which energizes drive line 100 and driver coil assembly 104. According to step P1004, the same drive voltage Va is transmitted to mimetic circuit 402 on mimetic line 414.

In step P1006, voltage comparator 422 determines the voltage difference Vv, and transmits this value to meter electronics 20 for use in a calculation of EMF according to Equation (6). The calculation of EMF is performed in step P1008, and step P1010 entails sending a signal corresponding to EMF to meter electronics 20. According to step P1012, the EMF signal is used to calculate tube motion in the manner of a conventional pickoff signal comprising EMF according to conventional Coriolis calculations. Meter electronics 20 uses the EMF calculation result in conventional Coriolis mass flow, density, and drive feedback calculations.

Those skilled in the art will recognize that the combined driver and pickoff assembly which is described above may be used to advantage in modal filtering systems for processing Coriolis flowmeter vibration signals. In general terms, the modal filtering analysis is used to selectively identify vibrational modes of interest to mass flow, density, and drive frequency measurements that are obtainable from Coriolis meters. This selective identification is used to eliminate noise, such as vibrations that are transmitted to the flow meter from a pipeline. Additional pickoffs, i.e., three or more pickoffs 105 and 105' (see FIG. 1), may be used in Coriolis flowmeters to enhance the specificity and selectivity of modal filtering analysis in identifying the signals of interest and eliminating noise. However, each additional pickoff can filter an additional vibrational mode that potentially adds to the specificity and selectivity problem in eliminating noise. Apparatus according to the present invention advantageously avoids the problem of adding to the number of signal pickoffs because the driver also functions as a pickoff.

What is claimed is:

1. An apparatus for use as a combined oscillatory signal pickoff device and vibrational driver, said apparatus comprising:

a driver coil assembly having a first impedance including:
  a coil in said driver coil assembly capable of emanating field effects derived from oscillating voltage leading to said coil, and a magnet in said driver coil assembly;
  means for positioning said magnet in operable relationship with respect to said coil wherein said magnet is driven in oscillation with respect to said coil responsive to field effects emanating from said coil;
a mimetic circuit determining a second impedance substantially similar to said first impedance when said magnet is stationary in fixed positional relationship with respect to said coil;
means for applying a drive voltage signal to said coil and said mimetic circuit to produce a coil voltage and said mimetic circuit voltage; and
means for calculating back electromotive force in said coil using voltage measurements obtained from at least one of said mimetic circuit and said drive coil assembly.

2. The apparatus as set forth in claim 1 wherein said mimetic circuit is an analog circuit.

3. The apparatus as set forth in claim 2 wherein said analog circuit includes a stationary coil and a stationary magnet.

4. The apparatus as set forth in claim 3 wherein said stationary coil and said stationary magnet in combination provide said second impedance identical to said first impedance when said driver coil assembly is restrained from motion.

5. The apparatus as set forth in claim 3 wherein said stationary coil and said stationary magnet in combination provide said second impedance differing by a scale factor to said first impedance when said driver coil assembly is restrained from motion.

6. The apparatus as set forth in claim 1 wherein said mimetic circuit is a digital circuit.

7. The apparatus as set forth in claim 6 wherein said digital circuit includes a digital filter.

8. The apparatus as set forth in claim 1 wherein said mimetic circuit includes a digital filter for modeling said first impedance and an analog voltage comparator.

9. The apparatus as set forth in claim 1 wherein said means for positioning said magnet in operable relationship with respect to said coil includes means for mounting said coil on a first Coriolis meter flow tube and for mounting said magnet on a second Coriolis flow tube opposed from said first Coriolis flow tube.

10. The apparatus as set forth in claim 9 wherein said magnet is centrally disposed within said coil.

11. The apparatus as set forth in claim 1 wherein said means for calculating back electromotive force includes means for comparing voltage between said driver coil assembly and said mimetic circuit.

12. The apparatus as set forth in claim 11 wherein said means for calculating back electromotive force includes a processor that proceeds according to the equation: voltage difference between said driver coil voltage and said mimetic circuit voltage equals back electromotive force of said drive coil divided by a time-varying impedance of the drive coil.

13. A method of using a driver coil assembly to cause vibrations while using said driver coil assembly as a pickoff to receive telemetry corresponding to said vibrations and determine back electromotive force applied to flow tubes by said drive coil assembly, said method comprising the steps of:

applying a drive voltage to a driver coil assembly having a first impedance, wherein said driver coil assembly includes a coil and a magnet;

applying said drive voltage to a mimetic circuit determining a second impedance substantially similar to said first impedance when said driver coil assembly is held in a stationary position; and calculating back electromotive force in said coil from said first and said second impedance, said back electromotive force being proportional to a voltage difference between said coil and said mimetic circuit.

14. The method as set forth in claim 13 wherein said step of applying said drive voltage to said driver coil assembly includes a step of vibrating a pair of flow tubes in a Coriolis flow meter.

15. The method as set forth in claim 13 wherein said step of calculating said back electromotive force proceeds according to an equation: voltage difference between said driver coil voltage and said mimetic circuit voltage equals back electromotive force of said drive coil divided by a time-varying impedance of the drive coil.

16. The method as set forth in claim 13 wherein said step of applying said drive voltage to a mimetic circuit includes applying said drive voltage to an analog mimetic circuit.

17. The method as set forth in claim 13 wherein said step of applying said drive voltage to a mimetic circuit includes applying said drive voltage to a digital mimetic circuit.

* * * * *